(12) United States Patent
Koti et al.

(10) Patent No.: US 11,440,528 B2
(45) Date of Patent: Sep. 13, 2022

(54) SYSTEMS AND METHODS FOR MANAGING AFTERTREATMENT SYSTEMS

(71) Applicant: Cummins Inc., Columbus, IN (US)

(72) Inventors: Archit N. Koti, Columbus, IN (US); Apurva A. Chunodkar, Greenwood, IN (US); Arun Prakash Thunga Gopal, Columbus, IN (US); Feng Liu, Columbus, IN (US); Kenneth M. Follen, Greenwood, IN (US); Michael Haas, Columbus, IN (US); Pinak Jayant Tulpule, Columbus, IN (US); Vivek A. Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 474 days.

(21) Appl. No.: 16/514,753

(22) Filed: Jul. 17, 2019

(65) Prior Publication Data
US 2020/0031332 A1    Jan. 30, 2020

Related U.S. Application Data

(60) Provisional application No. 62/711,189, filed on Jul. 27, 2018.

(51) Int. Cl.
*B60W 20/10* (2016.01)
*F01N 3/20* (2006.01)
(Continued)

(52) U.S. Cl.
CPC ............ *B60W 20/10* (2013.01); *B60W 10/06* (2013.01); *B60W 10/08* (2013.01); *B60W 10/30* (2013.01);
(Continued)

(58) Field of Classification Search
CPC ...... B60W 20/10; B60W 10/06; B60W 10/08; B60W 10/30; B60W 30/18; B60W 50/0097; B60W 2400/00; B60W 2510/06; B60W 2520/10; B60W 2710/0666; B60W 2556/50; B60W 2720/10; B60W 20/16; B60W 20/12; B60W 30/143; F01N 3/206;
(Continued)

(56) References Cited

U.S. PATENT DOCUMENTS

| 6,912,848 B2 | 7/2005 | Bedapudi |
| 8,392,091 B2 | 3/2013 | Hebbale et al. |

(Continued)

FOREIGN PATENT DOCUMENTS

| DE | 10 2014 216 217 | | 2/2016 | |
| DE | 10 2017 216 787 A1 | * | 3/2019 | ............. F02D 29/02 |

(Continued)

OTHER PUBLICATIONS

Partial Search Report on European Application No. 19188645.6, dated Jan. 7, 2020, 14 pages.

*Primary Examiner* — Brian P Sweeney
(74) *Attorney, Agent, or Firm* — Foley & Lardner LLP

(57) ABSTRACT

A vehicle comprises an aftertreatment system configured to reduce constituents of an exhaust gas. The vehicle also includes a controller configured to determine a predicted load on the vehicle during a route, and adjust at least one of a temperature of the aftertreatment system or an amount of a reductant inserted into the aftertreatment system based on the predicted load.

20 Claims, 7 Drawing Sheets

(51) Int. Cl.
*F02D 41/02* (2006.01)
*B60W 10/06* (2006.01)
*B60W 10/08* (2006.01)
*B60W 10/30* (2006.01)
*B60W 30/18* (2012.01)
*B60W 50/00* (2006.01)
*B60K 6/24* (2007.10)

(52) U.S. Cl.
CPC ........ *B60W 30/18* (2013.01); *B60W 50/0097* (2013.01); *F01N 3/206* (2013.01); *F01N 3/208* (2013.01); *F02D 41/021* (2013.01); *B60K 6/24* (2013.01); *B60W 2400/00* (2013.01); *B60W 2510/06* (2013.01); *B60W 2520/10* (2013.01); *B60W 2710/0666* (2013.01); *B60Y 2200/92* (2013.01); *F01N 2610/02* (2013.01)

(58) Field of Classification Search
CPC .... F01N 3/208; F01N 2610/02; F01N 3/2033; F01N 3/2013; F01N 2610/03; F01N 2900/0601; F01N 2900/10; F01N 3/2066; F01N 9/00; F02D 41/021; F02D 41/0235; F02D 41/1401; F02D 41/024; F02D 41/405; F02D 2041/0265; F02D 2041/1437; F02D 2200/0804; F02D 2200/501; F02D 2200/701; F02D 2200/702; F02D 2250/24; F02D 2250/26; B60K 6/24; B60K 2006/4825; B60K 6/48; B60Y 2200/92; Y02T 10/62; Y02T 10/12; Y02T 10/40; Y02A 50/20

See application file for complete search history.

(56) References Cited

U.S. PATENT DOCUMENTS

| | | | |
|---|---|---|---|
| 8,473,177 | B2 | 6/2013 | Madurai Kumar et al. |
| 8,720,185 | B2 | 5/2014 | Webb et al. |
| 8,818,659 | B2 | 8/2014 | Sujan et al. |
| 8,899,018 | B2 | 12/2014 | Frazier et al. |
| 9,038,373 | B2 | 5/2015 | Geveci et al. |
| 9,103,248 | B2 | 8/2015 | Light-Holets |
| 9,181,835 | B2 | 11/2015 | Aliyev |
| 9,194,318 | B2 | 11/2015 | Sujan et al. |
| 11,015,504 | B2 * | 5/2021 | Balthes ................ F01N 13/009 |
| 2010/0043404 | A1 * | 2/2010 | Hebbale .................... F01N 9/00 60/286 |
| 2013/0213010 | A1 | 8/2013 | Zhang et al. |
| 2015/0104363 | A1 | 4/2015 | Singh et al. |
| 2015/0330503 | A1 | 11/2015 | Sujan et al. |
| 2016/0040615 | A1 | 2/2016 | Sujan et al. |
| 2017/0211493 | A1 | 7/2017 | Kidd et al. |

FOREIGN PATENT DOCUMENTS

| | | |
|---|---|---|
| WO | WO-2011/162700 | 12/2011 |
| WO | WO-2015/048099 A1 | 4/2015 |
| WO | WO-2017/190760 | 11/2017 |

* cited by examiner

SYSTEMS AND METHODS FOR MANAGING AFTERTREATMENT SYSTEMS

CROSS-REFERENCE TO RELATED APPLICATIONS

The present disclosure claims priority to and benefit of U.S. Provisional Application No. 62/711,189, filed Jul. 27, 2018, the entire disclosure of which is hereby incorporated by reference herein.

TECHNICAL FIELD

The present disclosure relates generally to predictive management of an aftertreatment system included in a vehicle using one or more operating parameters of the vehicle.

BACKGROUND

Exhaust aftertreatment systems are used to receive and treat exhaust gas generated by internal combustion (IC) engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then communicated to the catalyst included in the SCR system to decompose substantially all of the NOx gases into relatively harmless byproducts that are expelled out of the aftertreatment system. Optimal operation of an aftertreatment system, for example, operation at an optimal efficiency thereof, may depend upon a temperature of the aftertreatment system. Furthermore, an amount of reductant used by the aftertreatment system for reducing components of the exhaust gas may be based on various parameters of the exhaust gas. Inefficient temperature control of the aftertreatment system and/or amount of reductant inserted into the aftertreatment system may lead to a decrease in fuel economy of the vehicle and/or excessive reductant consumption and/or undesired emissions.

SUMMARY

Embodiments described herein relate generally to systems and methods for managing operation of an aftertreatment system included in a vehicle and in particular, to vehicle controllers that use various systems included in a vehicle, for example, a transmission, a heating system of an aftertreatment system, an electromagnetic device, an energy storage device or a reductant insertion assembly to increase efficiency of the aftertreatment system and increase fuel economy based on at least one of internal, external static or external dynamic inputs.

In some embodiments, a vehicle comprises an aftertreatment system configured to reduce constituents of an exhaust gas. The vehicle also includes a controller configured to determine a predicted load on the vehicle during a route, and adjust at least one of a temperature of the aftertreatment system or an amount of a reductant inserted into the aftertreatment system based on the predicted load.

In some embodiments, an aftertreatment system for use in a vehicle comprises a controller configured to determine a predicted load on the vehicle during a route, and adjust at least one of a temperature of the aftertreatment system or an amount of a reductant inserted into the aftertreatment system based on the predicted load.

In some embodiments, a method comprises determining a predicted load on a vehicle during a route, the vehicle including an aftertreatment system coupled to an engine. At least one of a temperature of the aftertreatment system or an amount of a reductant inserted into the aftertreatment system is adjusted based on the predicted load.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE FIGURES

The foregoing and other features of the present disclosure will become more fully apparent from the following description and appended claims taken in conjunction with the accompanying figures. Understanding that these figures depict only several implementations in accordance with the disclosure and are therefore not to be considered limiting of its scope, the disclosure will be described with additional specificity and detail through use of the accompanying drawings.

Figure 1A:
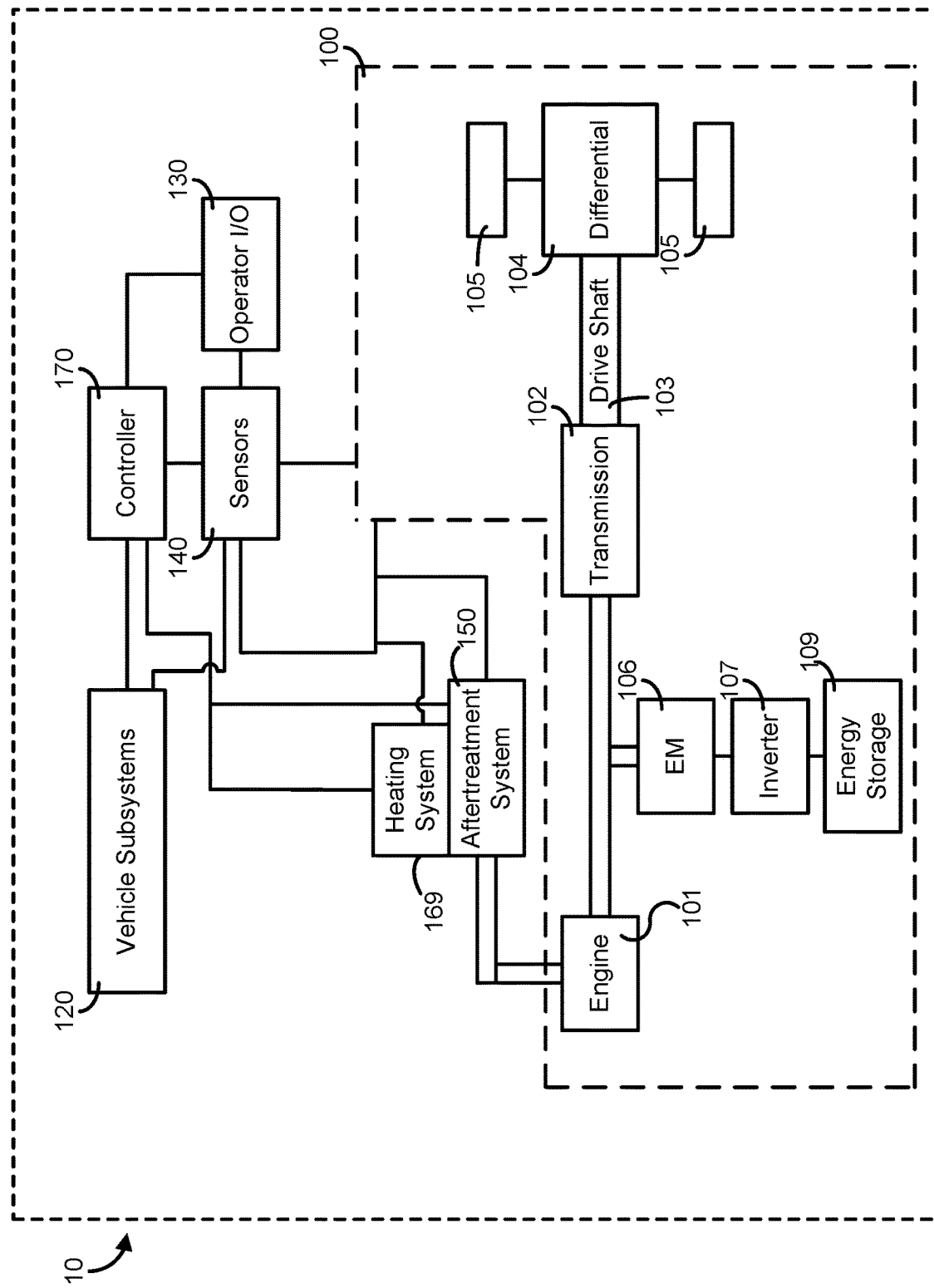
FIG. 1A is a schematic illustration of a vehicle including an aftertreatment system and a controller, according to an embodiment.

Reference is made to the accompanying figures throughout the following detailed description. In the figures, similar symbols typically identify similar components unless context dictates otherwise. The illustrative implementations described in the detailed description, figures, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for managing operation of an aftertreatment system included in a vehicle and in particular, to vehicle controllers that use various systems included in a vehicle, for example, a transmission, a heating system of an aftertreatment system, an electromagnetic device, an energy storage device or a reductant insertion assembly to increase efficiency of the aftertreatment system and increase fuel economy based on at least one of internal, external static or external dynamic inputs.

Some vehicles include controllers configured to manage fuel efficiency of the vehicle based on various internal and external inputs. Internal inputs may include feedback or information from any onboard component included in the vehicle such as, for example, temperature sensors, pressure sensors, NOx sensors, fuel rate, reductant rate, etc. External inputs may include, for example, external static inputs that represent an environment external to the vehicle and that are not expect to change with time. These may include, for example, road grade and vehicle speed limit. Such information may be obtained via various sources, for example, global positioning systems (GPS), onboard maps, etc. External inputs may also include external dynamic inputs that also represent an environment to the vehicle and that dynamically change with time. Such inputs may include, for example, construction speed limits, traffic density, operational status of fueling or charging stations, changing weather patterns, etc. Such information may be received through various sources, for example, aerial surveillance, video camera surveillance, fixed sensors, news feeds, highway advisory radio, vehicle-to-vehicle, vehicle-to-server or vehicle-to-infrastructure communication, or any other source. This information may be used to predictively control various vehicle subsystems, for example, vehicle transmission to control torque, an air/fuel ratio, balance load between engine and power source in hybrid vehicles, etc. so as to manage fuel efficiency.

However, the various subsystems used to control fuel efficiency may also have an impact on the performance of an aftertreatment system included in the vehicle, which is configured to reduce constituents of an exhaust gas produced by an engine of the vehicle. For example, changes in engine load may cause an increase or decrease in an amount of NOx gases included in the aftertreatment system. Conventional vehicles generally adjust an amount of reductant to be inserted into the aftertreatment system in response to the changes in one or more exhaust gas operating parameters. Furthermore, a temperature of the aftertreatment system is also generally adjusted reactively based on a current temperature of the aftertreatment system Various embodiments of the systems and methods described herein may provide benefits including, for example: (1) providing predictive control of a temperature of an aftertreatment system of a vehicle using powertrain controls along with predictive vehicle and route information (2) allowing the aftertreatment system to respond faster to improve efficiency; (3) reducing amount of fuel consumed to achieve a target aftertreatment system temperature; and (4) increasing reductant consumption efficiency and fuel economy.

FIG. 1A is schematic block illustration of a vehicle 10 with a controller 170, according to an embodiment. As shown in FIG. 1A, the vehicle 10 generally includes a powertrain 100, vehicle subsystems 120, an operator input/output (I/O) device 130, sensors 140 communicably coupled to one or more components of the vehicle 10, and a controller 170. It is to be understood that while FIG. 1 shows the vehicle including a particular powertrain 100, the vehicle 10 may include any other powertrain (e.g., a purely electric power driven powertrain or any other suitable powertrain).

As depicted, the powertrain 100 of the vehicle 10 is structured as a series hybrid powertrain. In other embodiments, the powertrain 100 may be structured as a parallel hybrid powertrain, or a full electric powertrain. In some embodiments, the powertrain 100 of the vehicle 10 is structured as another type of hybrid powertrain. In some embodiments, the powertrain 100 is structured as a conventional, non-hybrid, non-electric powertrain. The vehicle 10 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle. Thus, the present disclosure is applicable with a wide variety of implementations.

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 170 is communicably coupled to the systems and components in the vehicle 10 of FIG. 1A, the controller 170 is structured to receive data regarding one or more of the components shown in FIG. 1. For example, the data may include operation data regarding the operating conditions of the powertrain 100, and/or other components (e.g., a battery system, a motor, a generator, a regenerative braking system, an engine, etc.) acquired by one or more sensors, such as sensors 140. As another example, the data may include an input from operator I/O device 130. The controller 170 may determine how to control the powertrain 100 based on the operation data.

As shown in FIG. 1A, the powertrain 100 includes an engine 101, a transmission 102, a driveshaft 103, a differential 104, a final drive 105, an electromagnetic (EM) device 106 (e.g., a generator, a motor-generator, etc.), an inverter 107, and an energy storage device 109. In some embodiments, the powertrain 100 may also include a second electromagnetic device in series with the electromagnetic device 106. The engine 101 may be structured as any engine type, including a spark-ignition internal combustion engine, a compression-ignition internal combustion engine, and/or a fuel cell, among other alternatives. The engine 101 may be powered by any fuel type (e.g., diesel, ethanol, gasoline, natural gas, propane, hydrogen, etc.). As shown, the engine 101 is a diesel powered compression-ignition engine. Similarly, the transmission 102 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission 102 may include a variety of settings (gears, for a geared transmission) that affect different output speeds based on an input speed received thereby. Like the engine 101 and the transmission 102, the driveshaft 103, differential 104, and/or final drive 105 may be structured in any configuration dependent on the application (e.g., the final drive 105 is structured as wheels in an automotive application and a propeller in a boat application, etc.). Further, the driveshaft 103 may be structured as any type of driveshaft including, but not limited to, a one-piece, two-piece, and a slip-in-tube driveshaft based on the application.

As shown in FIG. 1A, the engine 101 and the electromagnetic device 106 are mechanically coupled together (e.g., via a shaft, a gear box, etc.). In some embodiments, the electromagnetic device 106 is a single device having both generating and motoring capabilities. In some embodiments, the electromagnetic device 106 has only generating capabilities. In other embodiments, the electromagnetic device 106 has only motoring capabilities. According to an example embodiment, the engine 101 is structured to drive the electromagnetic device 106 to generate electrical energy. As shown in FIG. 1, the electromagnetic device 106 is electrically coupled to the energy storage device 109 via an inverter 107 such that the electromagnetic device 106 may provide energy generated thereby to the energy storage device 109 for storage. In some embodiments, the electromagnetic device 106 is structured to receive stored electrical energy from the energy storage device 109 to facilitate operation thereof. By way of example, the electromagnetic device 106 may receive stored electrical energy from the energy storage device 109 to facilitate starting the engine 101. As shown in FIG. 1A, the electromagnetic device 106 is also mechanically coupled to the transmission 102 (e.g., via a shaft, a gear box, etc.). For example, the vehicle 10 may include a hybrid vehicle drivable using power from the engine 101, the energy storage device 109 via the electromagnetic device 106, or a combination thereof.

As shown in FIG. 1A, the electromagnetic device 106 is electrically coupled to the energy storage device 109 such that the electromagnetic device 106 may receive energy stored by the energy storage device 109 and/or generated by the electromagnetic device 106 to facilitate operation thereof. By way of example, the electromagnetic device 106 may receive stored electrical energy from the energy storage device 109 to facilitate providing a mechanical output to the transmission 102. In some embodiments, the electromagnetic device 106 is structured to generate electrical energy for storage in the energy storage device 109. By way of example, the electromagnetic device 106 may be structured to utilize a negative torque supply to perform energy regeneration (e.g., when the torque demand therefrom is zero, during engine braking, while the vehicle 10 is coasting down a hill, etc.).

According to an example embodiment, the energy storage device 109 includes one or more batteries (e.g., high voltage batteries, a lead-acid battery, a lithium-ion battery, etc.), one or more capacitors (e.g., super capacitors, etc.), and/or any other energy storage devices, or combination thereof. As shown in FIG. 1A, the energy storage device 109 is electrically coupled to the electromagnetic device 106. In some embodiments, the energy storage device 109 and the electromagnetic device 106 are electrically coupled to one or more of the vehicle subsystems 120 (e.g., a regenerative braking system, electrically-powered vehicle accessories, etc.).

According to the example embodiment shown in FIG. 1A, the energy storage device 109 is structured to store electrical energy (i) received from a charging station (e.g., a vehicle charging station, etc.), (ii) generated by the electromagnetic device 106, and/or (iii) generated by a regenerative braking system. The energy storage device 109 may be structured to provide the stored electrical energy to (i) the vehicle subsystems 120 to operate various electrical based components of the vehicle 10 (e.g., while the engine 101 is running, while the engine 101 is off, etc.), (ii) the electromagnetic device 106 to start the engine 101 (e.g., in response to a restart command after a stop-start feature turns off the engine 101, when an operator keys on the engine 101, etc.), and/or (iii) the electromagnetic device 106 to facilitate providing a mechanical output to the transmission 102 (e.g., to drive the vehicle 10, etc.).

The vehicle 10 includes the vehicle subsystems 120. In some embodiments, the vehicle subsystems 120 may include a regenerative braking system. The regenerative braking system may include various components structured to generate electricity from vehicle braking events to be stored by the energy storage device 109 for future use (e.g., by the electromagnetic device 106, by the electrical vehicle components, etc.). The vehicle subsystems 120 may include other components including mechanically driven or electrically driven vehicle components (e.g., HVAC system, lights, pumps, fans, etc.).

The vehicle subsystems 120 may include one or more electrically-powered accessories and/or engine-drive accessories. Electrically-powered accessories may receive power from the energy storage device 109 and/or the electromagnetic device 106 to facilitate operation thereof. Being electrically-powered, the accessories may be able to be driven largely independent of the engine 101 of the vehicle 10 (e.g., not driven off of a belt coupled to the engine 101). The electrically-powered accessories may include, but are not limited to, air compressors (e.g., for pneumatic devices, etc.), air conditioning systems, power steering pumps, engine coolant pumps, fans, and/or any other electrically-powered vehicle accessories.

In a traditional, non-hybrid or non-electric powertrain, the engine 101 receives a chemical energy input (e.g., a fuel such as gasoline, diesel, etc.) and combusts the fuel to generate mechanical energy, in the form of a rotating crankshaft. The transmission 102 receives the rotating crankshaft and manipulates the speed of the crankshaft (e.g., the engine revolutions-per-minute (RPM), etc.) to affect a desired driveshaft speed. The rotating driveshaft 103 is received by the differential 104, which provides the rotation energy of the driveshaft 103 to the final drive 105 (e.g., wheels of the vehicle 10). The final drive 105 then propels or moves the vehicle 10.

In the powertrain 100 of the present disclosure, the engine 101 provides mechanical energy to the electromagnetic device 106 such that the electromagnetic device 106 generates electrical power. The electromagnetic device 106 may provide the generated electrical power to the energy storage device 109 and/or a second electromagnetic device.

The operator I/O device 130 may enable an operator of the vehicle 10 (or passenger or manufacturing, service, or maintenance personnel) to communicate with the vehicle 10 and the controller 170. By way of example, the operator I/O device 130 may include, but is not limited to, an interactive display, a touchscreen device, one or more buttons and switches, voice command receivers, and the like. The operator I/O device 130 may also include a brake pedal or a brake lever, an accelerator pedal, and/or an accelerator throttle.

The sensors 140 may include sensors positioned and structured to monitor operating characteristics of various components of the vehicle 10. By way of example, the sensors 140 may include a sensor structured to facilitate monitoring the state of charge (SOC), the state of health (SOH), and/or the power capacity of the energy storage device 109, and/or the flow of electricity into and/or out of the energy storage device 109 (e.g., current, voltage, power, etc.). The sensors 140 may additionally or alternatively include a position sensor structured to facilitate monitoring the position of the accelerator (e.g., accelerator pedal, accelerator throttle, etc.) and/or the brake (e.g., brake pedal, brake lever, etc.) of the vehicle 10. The sensors 140 may additionally or alternatively include a speed sensor structured to facilitate monitoring the speed of the vehicle 10. The sensors 140 may additionally or alternatively include an obstacle sensor structured to facilitate detecting whether the vehicle 10 (e.g., a wheel thereof, etc.) encounters an obstacle (e.g., a curb, a rock, a boulder, a speed bump, a pothole, etc.). In some embodiments, the sensors 140 may include a GPS sensor configured to sense a position of the vehicle.

Figure 1B:
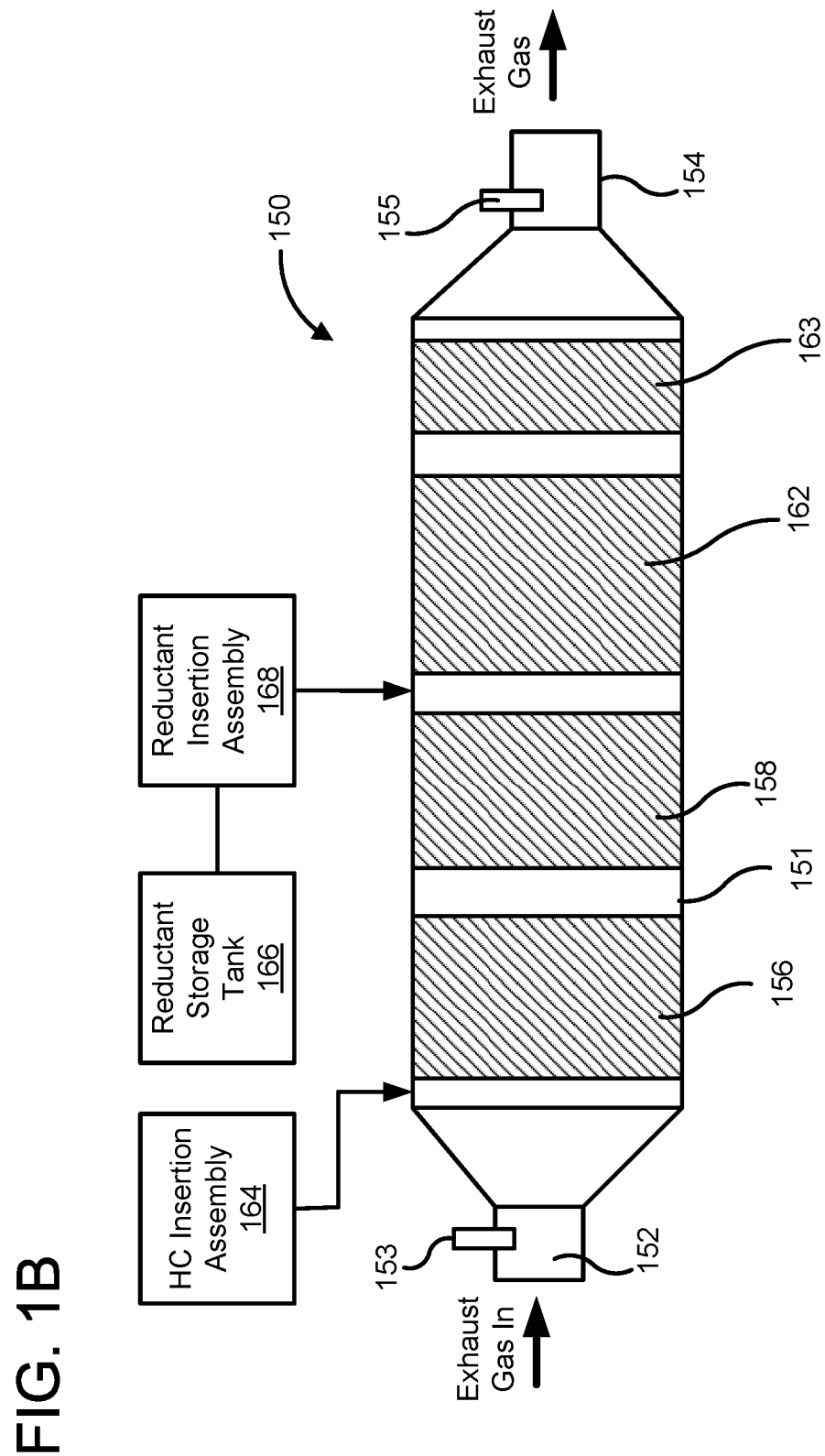
FIG. 1B is a schematic illustration of an aftertreatment system that may be included in the vehicle of FIG. 1A, according to an embodiment.

As previously described herein, the engine 101 combusts fuel to produce an exhaust gas including NOx gases, particulate matter (e.g., ash or soot), carbon monoxide and other constituents which need to be removed from the exhaust gas before the exhaust gas is expelled into the environment. The vehicle 10 includes an aftertreatment system 150 configured to reduce constituents of the exhaust gas. FIG. 1B shows a more detailed schematic illustration of the aftertreatment system 150, according to a particular embodiment.

The aftertreatment system 150 comprises a housing 151 defining an internal volume within which a plurality of aftertreatment components structured to modify or reduce certain constituents of an exhaust flowing therethrough are positioned. The housing 151 may be formed from a rigid, heat-resistant and corrosion-resistant material, for example stainless steel, iron, aluminum, metals, ceramics, a combination thereof, or any other suitable material. An inlet conduit 152 is fluidly coupled to an inlet of the housing 151 and structured to receive exhaust gas from the engine 101 and to communicate the exhaust gas to an internal volume defined by the housing 151. Furthermore, an outlet conduit 154 may be coupled to an outlet of the housing 151 and structured to expel treated exhaust gas into the environment.

A first sensor 153 may be positioned in the inlet conduit 152. The first sensor 153 may comprise a NOx sensor, for example a physical or virtual NOx sensor, configured to determine an amount of NOx gases included in the exhaust gas being emitted by the engine 101. In various embodiments, an oxygen sensor, a temperature sensor, a pressure sensor, or any other sensor may also be positioned in the inlet conduit 152 so as to determine one or more operational parameters of the exhaust gas flowing through the aftertreatment system 150. A second sensor 155 is positioned in the outlet conduit 154. The second sensor 155 may comprise a second NOx sensor configured to determine an amount of NOx gases expelled into the environment (or to a muffler coupled to the housing 151) after passing through the aftertreatment system 150. In other embodiments, one or more of a sulfur oxide sensor, a particulate matter sensor or an ammonia slip sensor may also be positioned in the outlet conduit 154.

In the example shown in which the engine 101 is a diesel engine, the aftertreatment system 150 may include a SCR catalyst 162 configured to modify or reduce certain constituents of the exhaust gas (e.g., NOx gases such as such nitrous oxide, nitric oxide, nitrogen dioxide, etc.), flowing through the aftertreatment system 150 in the presence of a reductant, as described herein. The SCR catalyst 162 is formulated to modify or reduce certain constituents of an exhaust gas, for example NOx gases, flowing through the aftertreatment system 150. A reductant insertion port may be provided on a sidewall of housing 151 and structured to allow insertion of the reductant therethrough into the internal volume defined by the housing 151. The reductant insertion port may be positioned upstream of the SCR catalyst 162 (e.g., to allow reductant to be inserted into the exhaust gas upstream of the SCR catalyst 162) or over the SCR catalyst 162 (e.g., to allow reductant to be inserted directly on the SCR catalyst 162).

The SCR catalyst 162 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The SCR catalyst 162 can be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 162. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the SCR catalyst 162 such that any NOx gases included in the exhaust gas are further reduced to yield an exhaust gas which is substantially free of NOx gases.

A particulate filter 158 may be positioned upstream of the SCR catalyst 162 or at any other location in the aftertreatment system 150, and configured to filter particulate matter (e.g., ash, soot, etc.) included in the exhaust gas flowing through the aftertreatment system 150. An oxidation catalyst 156 may be positioned upstream of the particulate filter 158. The oxidation catalyst 156 may include, for example, a diesel oxidation catalyst configured to decompose unburnt hydrocarbons and/or convert CO to $CO_2$. In some embodiments, the aftertreatment system 150 may also include a hydrocarbon (HC) insertion assembly 164 configured to insert hydrocarbons into the flow path of the exhaust gas, for example, to increase a temperature of the exhaust gas (e.g., by combusting in the exhaust gas due to the high temperature thereof or oxidizing across an oxidation catalyst element). The hydrocarbon insertion assembly 164 may comprise an independent fuel injection device coupled with the aftertreatment upstream of an oxidation catalyst, or may comprise an integrated in-cylinder late post fuel injection capability of engine 101. In this manner, a temperature of the exhaust gas and therefore, the aftertreatment system 150 may be maintained at a desired temperature (e.g., to maintain a temperature of the SCR catalyst 162 at a desired temperature) and/or to regenerate the oxidation catalyst 156, the particulate filter 158 and/or the SCR catalyst 162. While not shown, the aftertreatment system 150 may also include other aftertreatment components, for example, mixers, baffle plates, or any other suitable aftertreatment component.

The aftertreatment system 150 may also include a reductant storage tank 166 structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name) ADBLUE®). For example, the reductant may comprise an aqueous urea solution having a particular ratio of urea to water. In particular embodiments, the reductant can comprise an aqueous urea solution including 32.5% to 40% by volume of urea and 67.5% to 60% by volume of deionized water.

A reductant insertion assembly 168 is fluidly coupled to the reductant storage tank 166. The reductant insertion assembly 168 is configured to selectively insert the reductant into the SCR catalyst 162 or upstream thereof (e.g., into the inlet conduit 152) or a mixer (not shown) positioned upstream of the SCR catalyst 162. The reductant insertion assembly 168 may comprise various structures to facilitate receipt of the reductant from the reductant storage tank 166 and delivery to the SCR catalyst 162, such as, for example, pumps, valves, filter screens, pulsation dampers, orifices, reductant injectors, dosing valves, etc.

In some embodiments, an ammonia slip catalyst 163 may be disposed in the housing 151 downstream of the SCR catalyst 162 and formulated to decompose any ammonia in the exhaust gas downstream of the SCR catalyst 162. For example, the reductant may decompose into ammonia on contact with the hot exhaust gas. The ammonia facilitates the catalytic reaction occurring in the SCR catalyst 162 for converting or reducing the NOx gases included in the exhaust gas. If the exhaust gas temperature of the SCR catalyst 162 is too low, not all of the reductant may decompose into ammonia leading to lower catalytic efficiency, or the ammonia may remain unreacted passing through the SCR catalyst 162 leading to ammonia slip.

Thus, maintaining a temperature of the SCR catalyst 162 at a desired temperature is desirable for efficient performance of the aftertreatment system 150. As shown in FIG. 1A, the vehicle 10 may also include a heating system 169 coupled to the aftertreatment system 150 and configured to maintain a temperature thereof. In some embodiments, the heating system 169 may include the hydrocarbon insertion assembly 164 configured to insert hydrocarbons into the exhaust gas to raise the temperature of the exhaust gas and thereby, the SCR catalyst 162 to a desired temperature. In other embodiments, the heating system 169 may include an electric heater configured to draw electric power, for example, from the energy storage device 109 for heating the SCR catalyst 162 to a desired temperature. In particular embodiments, the heating system 169 may include any aftertreatment heater described in U.S. Pat. No. 8,473,177 incorporated herein by reference in its entirety.

On the other hand insertion of larger quantities of reductant into the aftertreatment system 150 may also lead to ammonia slip. The SCR catalyst 162 has ammonia storage capacity and can store a finite amount of ammonia. However, continued insertion of reductant into the exhaust gas beyond the ammonia storage capacity of the SCR catalyst 162 results in un-utilized ammonia which slips downstream of SCR catalyst 162 and inefficient consumption of the reductant.

As the components of FIG. 1A are shown to be embodied in the vehicle 10, the controller 170 may be structured as one or more electronic control units (ECU). As such, the controller 170 may be separate from or included with at least one of a transmission control unit, the aftertreatment system 150, a powertrain control module, an engine control module, etc. As previously described herein, various systems of the vehicle 10 can be controlled to predictively manage the aftertreatment system 150, for example a temperature or an amount of reductant inserted into the aftertreatment system 150. In some embodiments, the controller 170 may be a central controller of the vehicle 10. In other embodiments, the controller 170 may be a controller of the aftertreatment system 150, which may be communicatively coupled to a central controller of the vehicle 10.

In some embodiments, the controller 170 may be configured to determine a predicted load on the vehicle 10 during a route, and adjust at least one of a temperature of the aftertreatment system 150 or an amount of a reductant inserted into the aftertreatment system 150 based on the predicted load. The controller 170 may also be configured to determine a predicted temperature of the aftertreatment system 150 based on the predicted load, and dynamically limit a torque of the engine 101 of the vehicle 10 (e.g., by adjusting the transmission 102) to limit engine transients and prevent fast temperature transients or oscillations in a temperature of the aftertreatment system 150 based on the predicted temperature. Dynamically limiting the engine torque may also limit ammonia slip and amount of NOx gases emitted from the aftertreatment system 150.

The controller 170 may be further configured to adjust at least a reductant insertion rate into the aftertreatment system 150 or a fuel insertion rate into the engine 101 or aftertreatment system 150 based on at least one of the predicted load and the predicted temperature. In some embodiments, the controller 170 may also be configured to determine a predicted cruise speed of the vehicle 10, and in response to determining that the predicted cruise speed of the vehicle is active with speed modulation, pause or disable a reductant diagnostic so as to reduce reductant consumption by the aftertreatment system 150. The controller 170 is further configured to adjust a cruise speed of the vehicle 10 based on an amount of ammonia stored in the aftertreatment system 150. In some embodiments, the controller 170 may be further configured to balance a power load between the engine 101 and the electromagnetic device 106 of the vehicle 10 so as to exert a predetermined load on the engine 101 for maintaining a temperature of the aftertreatment system 150. In some embodiments, the controller 170 may be further configured to selectively activate the heating system 169 for maintaining a temperature of the aftertreatment system 150 based on a current state of the aftertreatment system 150 and a current load on the engine 101, and/or the predicted load. In some embodiments, the controller 170 may be further configured to selectively cause engine braking so as to heat the aftertreatment system 150.

Figure 2:
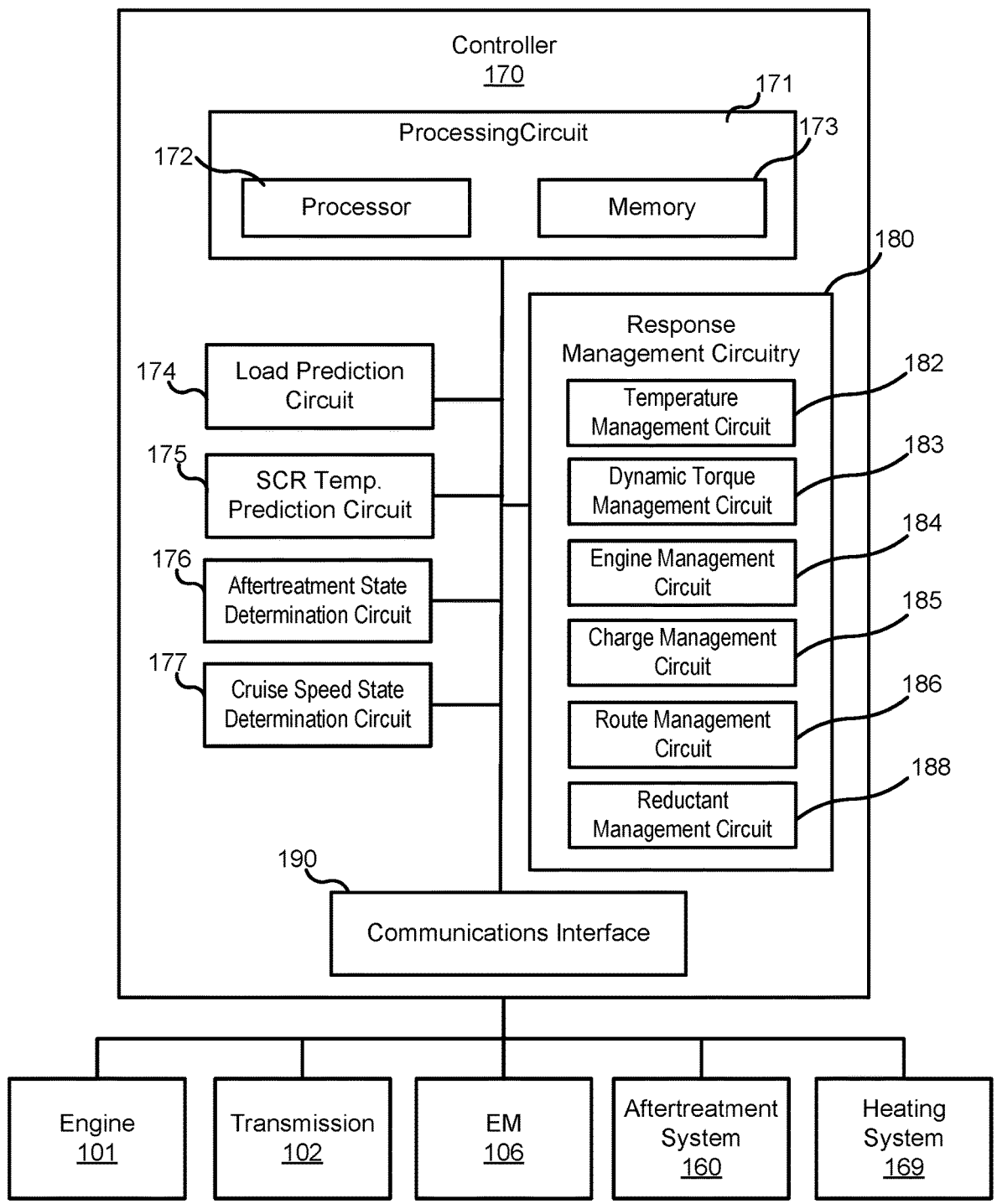
FIG. 2 is a schematic block diagram of the controller of the vehicle of FIG. 1A, according to an embodiment.

Expanding further, in various embodiments, the controller 170 may comprise an electronic control unit configured to receive various signals including internal, external static or external dynamic inputs as described herein for controlling transmission 102, heating system 169, load between electromagnetic device 106 and engine 101, a vehicle route on which the vehicle operates, cruise control operation, reductant insertion (e.g., via controlling the reductant insertion assembly 168), or any other component of the vehicle 10. As shown in FIG. 2, the controller 170 includes a processing circuit 171 having a processor 172 and a memory 173, a load prediction circuit 174, a SCR temperature prediction circuit 175, an aftertreatment state determination circuit 176 and a cruise speed state determination circuit 177. The controller 170 may also include a response management circuitry 180 including a temperature management circuit 182, a dynamic torque management circuit 183, an engine management circuit 184, a charge management circuit, 185, a route management circuit 186 and a reductant management circuit 188.

The processor 172 may comprise a microprocessor, programmable logic controller (PLC) chip, an ASIC chip, or any other suitable processor. The processor 172 is in communication with the memory 173 and configured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 170. The memory 173 is configured to store look up tables, algorithms, or instructions.

In one configuration, the load prediction circuit 174, the SCR temperature prediction circuit 175, the aftertreatment state determination circuit 176, the cruise speed state determination circuit 177, and the response management circuitry 180 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the load prediction circuit 174, the SCR temperature prediction circuit 175, the aftertreatment state determination circuit 176, the cruise speed state determination circuit 177, and the response management circuitry 180 are embodied as hardware units, such as separate or dedicated electronic control units. As such, the load prediction circuit 174, the SCR temperature prediction circuit 175, the aftertreatment state determination circuit 176, the cruise speed state determination circuit 177, and the response management circuitry 180 may be embodied as one or more circuitry components including, but not limited to, processing circuitry, network interfaces, peripheral devices, input devices, output devices, sensors, etc. In some embodiments, the load prediction circuit 174, the SCR temperature prediction circuit 175, the aftertreatment state determination circuit 176, the cruise speed state determination circuit 177, and the response management circuitry 180 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the load prediction circuit 174, the SCR temperature prediction circuit 175, the aftertreatment state determination circuit 176, the cruise speed state determination circuit 177, and the response management circuitry 180 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the load prediction circuit 174, the SCR temperature prediction circuit 175, the aftertreatment state determination circuit 176, the cruise speed state determination circuit 177, and the response management circuitry 180 may also include programmable hardware devices such as field programmable gate arrays, programmable array logic, programmable logic devices or the like. In this regard, the load prediction circuit 174, the SCR temperature prediction circuit 175, the aftertreatment state determination circuit 176, the cruise speed state determination circuit 177, and the response management circuitry 180 may include one or more memory devices for storing instructions that are executable by the processor(s) of the load prediction circuit 174, the SCR temperature prediction circuit 175, the aftertreatment state determination circuit 176, the cruise speed state determination circuit 177, and the response management circuitry 180. The one or more memory devices and processor(s) may have the same definition as provided below with respect to the memory 173 and the processor 172.

In the example shown, the controller 170 includes the processing circuit 171 having the processor 172 and the memory 173. The processing circuit 171 may be structured or configured to execute or implement the instructions, commands, and/or control processes described herein with respect to the load prediction circuit 174, the SCR temperature prediction circuit 175, the aftertreatment state determination circuit 176, the cruise speed state determination circuit 177, and the response management circuitry 180. Thus, the depicted configuration represents the aforementioned arrangement where the load prediction circuit 174, the SCR temperature prediction circuit 175, the aftertreatment state determination circuit 176, the cruise speed state determination circuit 177, and the response management circuitry 180 are embodied as machine or computer-readable media. However, as mentioned above, this illustration is not meant to be limiting as the present disclosure contemplates other embodiments such as the aforementioned embodiment where the load prediction circuit 174, the SCR temperature prediction circuit 175, the aftertreatment state determination circuit 176, the cruise speed state determination circuit 177, and the response management circuitry 180 are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the load prediction circuit 174, the SCR temperature prediction circuit 175, the aftertreatment state determination circuit 176, the cruise speed state determination circuit 177, and the response management circuitry 180 may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communications interface 190 may include wireless interfaces (e.g., jacks, antennas, transmitters, receivers, transceivers, wire terminals, etc.) for conducting data communications with various systems, devices, or networks. For example, the communications interface 190 may include an Ethernet card and port for sending and receiving data via an Ethernet-based communications network and/or a Wi-Fi transceiver for communicating with other vehicles (e.g., for vehicle-to-vehicle communication), a server (e.g., for vehicle-to-server communication), an infrastructure (e.g., for vehicle-to-infrastructure), the internet, news sources or any other sources of external static or dynamic inputs, and the controller 170 via, for example, a communication network (e.g., the cloud). The communications interface 190 may be structured to communicate via local area networks or wide area networks (e.g., the Internet, etc.) and may use a variety of communications protocols (e.g., IP, LON, Bluetooth, ZigBee, radio, cellular, near field communication, etc.). The communications interface 190 may also include a controller area network (CAN) bus for communication with internal vehicle components (e.g., the vehicle subsystems 120, the power train 100, the operator I/O 130, the sensors 140, the aftertreatment system 150 and/or the heating system 169), for example, via wired or wireless connections.

The load prediction circuit 174 is configured to predict a load to be encountered by the vehicle 10, for example, by the engine 101 of the vehicle 10 on a vehicle route. For example, the load prediction circuit 174 may determine a current location of the vehicle 10 on the route (e.g., via a GPS sensor included in the vehicle 10) and determine predicted load on the engine 101 based on external static and dynamic inputs received from various sources, as previously described herein (e.g., via the communication interface). Load on the vehicle 10 may be impacted by road grade, vehicle speed target, traffic conditions, weather patterns, etc. For example, an uphill climb may increase a load on the engine 101 causing it to burn more fuel or exert more torque which may result in the exhaust gas having a higher temperature and/or a higher amount of NOx gases. In contrast, a downward descent may utilize low torque or fuel consumption thereby yielding a colder exhaust gas and/or less amount of NOx. Similarly, stopping and starting based on traffic conditions my increase a load on the engine 101 relative to steady state driving (e.g., having a very little variation in speed) on a clear highway. Other driving conditions, for example, wind speed, may also impact the load on the engine 101.

The SCR temperature prediction circuit 175 is configured to predictively determine or estimate a temperature of the SCR catalyst 162 included in the aftertreatment system 150 based on the predicted load. As previously described herein, high load conditions may increase a temperature of the exhaust gas which will lead to an increase in temperature of the SCR catalyst 162. In contrast, low load conditions or steady state driving may lead to less fuel consumption and lowering of the temperature of the exhaust gas. The SCR temperature prediction circuit 175 may therefore be able to predict an expected temperature of the SCR catalyst 162 at various locations along the vehicle route based on the predicted load.

The aftertreatment state determination circuit 176 is configured to determine one or more operating parameters of the aftertreatment system 150, for example, the SCR catalyst 162 included in the aftertreatment system 150. For example, the aftertreatment state determination circuit 176 may be configured to receive internal input from temperature sensors coupled to the SCR catalyst 162 so as to determine a temperature thereof. The aftertreatment state determination circuit 176 may also be configured to determine an amount of reductant inserted into the aftertreatment system 150, for example, to estimate an amount of ammonia stored in the SCR catalyst 162, an ammonia slip, etc., and/or a predicted amount of reductant to be inserted into the aftertreatment system 150, for example, based on the predicted load on the vehicle 10 or a predicted temperature of the SCR catalyst 162.

The cruise speed state determination circuit 177 is configured to predict cruise operation of the vehicle 10. For example, the cruise speed state determination circuit 177 may be configured to determine if cruise control is inactive, is active with speed modulation or active without speed modulation, for example, based on predicted load determined by the load prediction circuit 174. For example, when cruise speed is active and a predicted load on the vehicle 10 is steady (e.g., a predicted clear vehicle route ahead) may indicate that cruise speed is active without modulation (i.e., transient changes in cruise speed will not occur). In contrast, changing traffic conditions may indicate that cruise speed is active with modulation (i.e., regularly changes or is transient).

The response management circuitry 180 is structured to receive the predicted load on the vehicle 10, the predicted temperature of the SCR catalyst 162, the state of the aftertreatment system 150, the cruise speed of the vehicle 10 and/or any other internal and/or external static and/or dynamic input, and adjust a temperature and/or an amount of reductant inserted into the aftertreatment system 150. This may increase a NOx conversion efficiency of the aftertreatment system 150 and/or increase fuel economy of the vehicle 10.

Expanding further, the temperature management circuit 182 is structured to use the predicted load and predicted SCR temperature determined by the load prediction circuit 174 and the SCR temperature prediction circuit 175 to predictively adjust a temperature of the SCR catalyst 162, for example, to reduce fuel consumption. For example, in some embodiments, the temperature management circuit 182 may use the predicted SCR temperature (e.g., determined from the predicted load) to avoid aggressive thermal management of the SCR catalyst 162. For example, the hydrocarbon insertion assembly 164 may be used to insert hydrocarbons, which may include fuel from the main fuel tank of the vehicle 10, into the exhaust gas to increase a temperature thereof and thereby, increase a temperature of the SCR catalyst 162. Alternatively, the engine 101 could provide hydrocarbons to the aftertreatment system 150 by means of a late post fuel injection. Generally, such a heating of the SCR catalyst 162 to a desired temperature is done regardless of the predicted load on the vehicle 10. In contrast, the temperature management circuit 182 uses the predicted SCR temperature based on the predicted load to make a decision on inserting hydrocarbons into the exhaust gas, or hold off one doing so, thereby saving fuel (and hence increasing fuel economy).

For example, if the load prediction circuit 174 predicts an increase in load on the vehicle 10 due to increase in road grade (e.g., a hill), traffic congestion, increased wind resistance, etc., this may correspond to a predicted increase in temperature of the exhaust gas and thereby, the SCR catalyst 162. The temperature management circuit 182 may instruct the hydrocarbon insertion assembly 164 to stop insertion of hydrocarbons into the exhaust gases, for example, once the predicted SCR temperature is above a predetermined temperature threshold, so as to save fuel. In other embodiments, the heating system 169 may include an electric heater which uses electric power, for example, provided by the inverter 107 (e.g., from the energy storage device 109). The temperature management circuit 182 may be configured to selectively activate the heating system 169 to maintain an SCR temperature or track a reference temperature, for example based on a state of the aftertreatment system 150 (e.g., as determined by the aftertreatment state determination circuit 176), current load on the vehicle 10, and/or predicted load on the vehicle 10. In such embodiments, the charge management circuit 185 may be configured to selectively charge or discharge the energy storage device 109, for example, by selectively switching primary driving power between the engine 101 and the electromagnetic device 106, so as to increase use of regeneration energy for heating the SCR catalyst 162.

Figure 3:
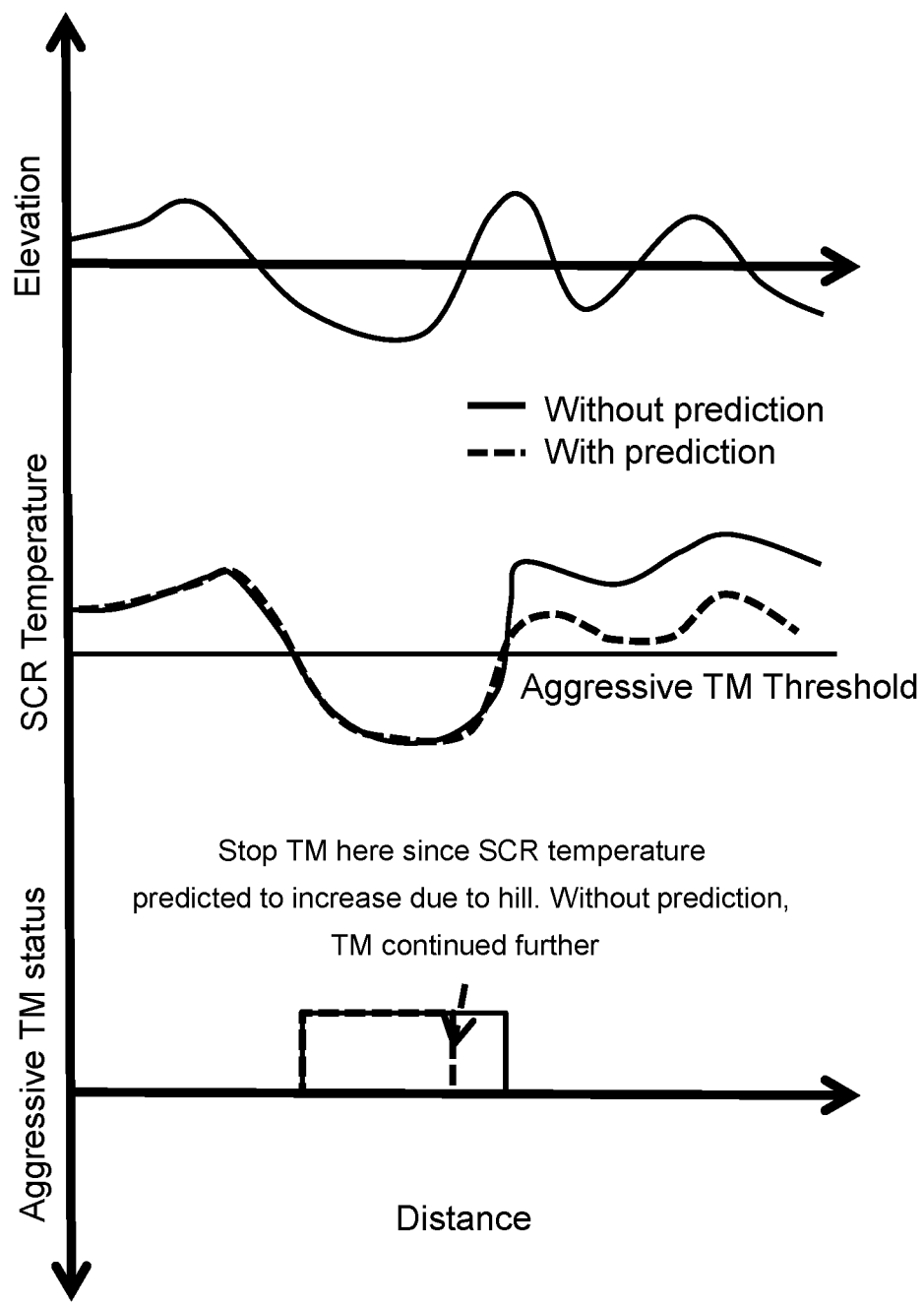
FIG. 3 are plots of temperature control of an SCR catalyst included in an aftertreatment system of a vehicle at various elevations with and without predictive temperature control based on predicted load on the vehicle.

FIG. 3 includes plots showing a particular example of SCR thermal management by the temperature management circuit 182. The top plot shows predicted elevation to be encountered by the vehicle 10 on the route. The middle plot shows SCR temperature management without prediction (i.e., using conventional temperature control) and with prediction. As shown, in the bottom plot, temperature management (e.g., insertion of hydrocarbons in the exhaust gas) is stopped at an earlier time point based on the predicted SCR temperature relative to temperature management without prediction resulting in fuel savings.

The dynamic torque management circuit 183 may be configured to control the transmission 102 to adjust (e.g., limit) dynamic torque of the engine 101 so as to prevent fast temperature transients or oscillations in the exhaust gas temperature and thereby, the SCR catalyst 162 temperature. Such temperature transients may occur due to fast changing load on the engine (e.g., frequently changing road grade, traffic, etc.). Fast temperature transients may degrade performance of the SCR catalyst 162 by causing ammonia desorption and ammonia slip from the SCR catalyst 162. Furthermore, fast temperature transients may also cause the temperature of the SCR catalyst 162 to exceed beyond a maximum allowable temperature of the SCR catalyst 162, which may degrade the SCR catalyst 162. The dynamic torque management circuit 183 may be configured to dynamically manage torque by controlling the transmission 102, for example, by limiting torque based on the predicted load or predicted SCR temperature so as to beneficially avoid both fast temperature transients, prevent the SCR temperature from exceeding the maximum allowable temperature, reduce ammonia slip and provide efficient reductant use.

Figure 4:
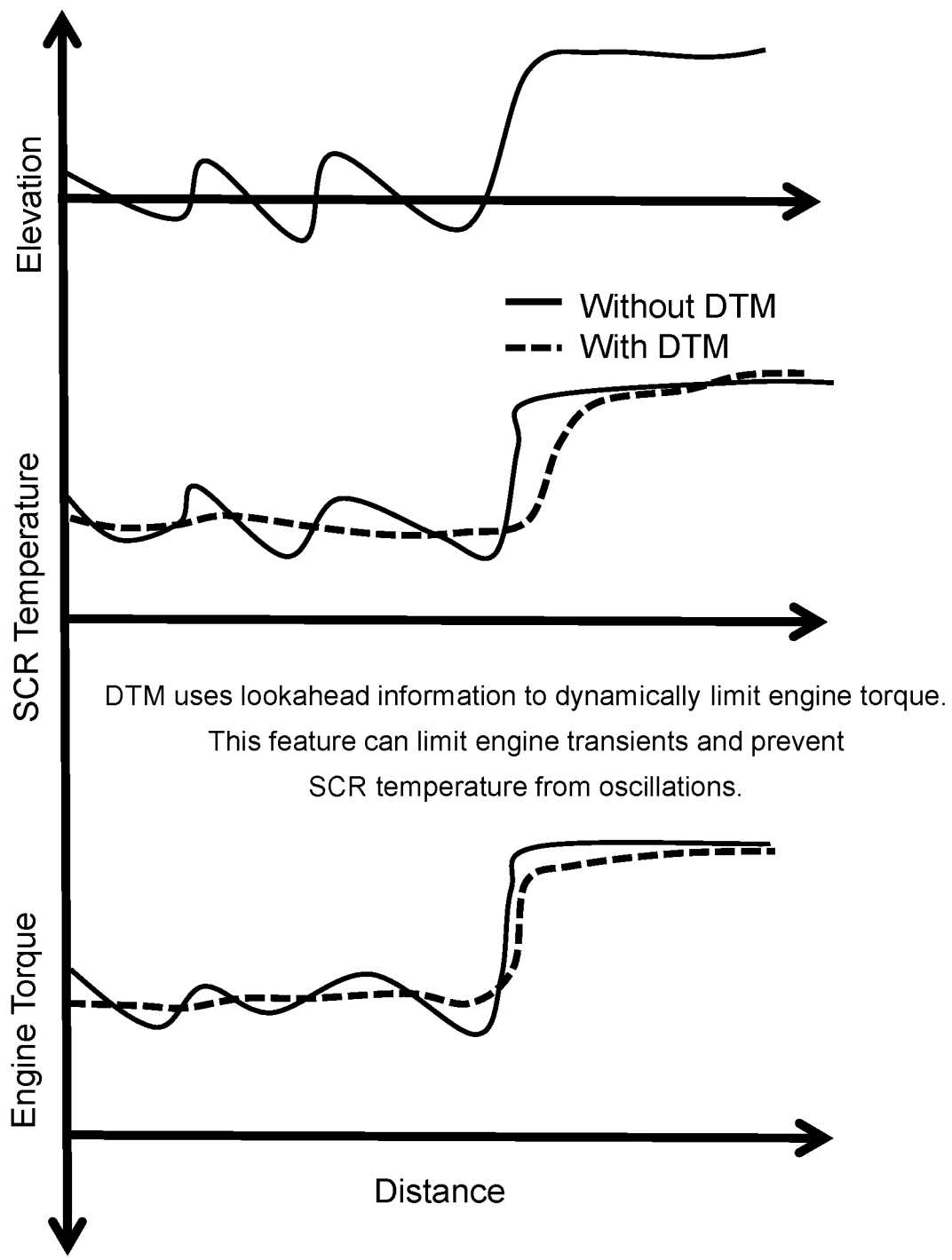
FIG. 4 shows plots of temperature control of an SCR system included in an aftertreatment system of a vehicle at various elevations with and without dynamic torque control of the vehicle.

For example, FIG. 4 includes plots showing a particular example of dynamic torque management by the dynamic torque management circuit 183. The top plot shows predicted elevation to be encountered by the vehicle 10 on the route. The elevation is not uniform with frequent changes in grade. The middle plot shows SCR temperature without dynamic torque management (DTM) and with dynamic torque management. As shown in the bottom plot, without dynamic torque management, the torque has frequent transients corresponding to the frequent changes in elevation, and lead to frequent transients in SCR temperature. In contrast, dynamic torque management substantially reduces the torque transients and results in lesser transients in the SCR temperature.

In some embodiments, the dynamic torque management circuit 183 may also dynamically limit torque based on predicted amount of NOx in the exhaust gas generated by the engine 101. For example, if the amount of NOx in the exhaust gas produced by the engine 101 is predicted to fluctuate rapidly (e.g., as determined by load prediction circuit 174), the dynamic torque management circuit 183 may dynamically limit torque to dynamically limit amount of the NOx in the exhaust gas emitted by the engine 101 so as to improve reductant usage efficiency (e.g., by allowing less reductant to be inserted into the aftertreatment system 150). Furthermore, the SCR catalyst 162 may build up a store of ammonia during vehicle 10 coasting events (e.g., determined by the aftertreatment state determination circuit 176), which may beneficially reduce the amount of reductant to be inserted into the aftertreatment system 150 for NOx reduction during high torque (i.e., high load events). The dynamic torque management circuit 183 may be configured to dynamically limit torque, for example, to produce greater amount of coasting events so as to build up ammonia storage and/or prolong coasting events to adjust weightage between fuel efficiency and reductant efficiency.

The engine management circuit 184 and the charge management circuit 185 may be configured to cooperatively split power between the engine 101 and electromagnetic device 106 based on a predicted load on the vehicle 10 to increase efficiency of the aftertreatment system 150 and reduce fuel consumption. The engine and charge management circuits 184 and 185 may use power demand from the vehicle 10 (e.g., as dictated by an operator) and current state of the aftertreatment system 150, as well as predicted load on the aftertreatment system 150 to determine power sharing between the engine 101 and the electromagnetic device 106, for example, such that the engine 101 runs at a specific operating point that enhances aftertreatment efficiency and/or create a specific load on the engine 101 to maintain the SCR catalyst 162 temperature or track a reference temperature profile.

For example, if the SCR catalyst temperature is within or exceeding a desired temperature range, the engine and charge management circuits 184 and 185 may cooperatively increase the load on the electromagnetic device 106 and exert less load on the engine 101, thereby improving fuel economy. However, if the temperature of the exhaust gas drops below the desired temperature range or the engine 101 is cold (e.g., at vehicle 10 startup or extended period of operation on the electromagnetic device 106), the engine and charge management circuits 184 and 185 may increase the load on the engine 101 so as to increase a temperature of the exhaust gas so as to heat the SCR catalyst 162.

In some embodiments, the engine management circuit 184 may also be configured to selectively adjust a fuel insertion rate into the engine 101 or the hydrocarbon insertion assembly 164, and the reductant management circuit 188 may be configured to adjust a reductant insertion rate into the aftertreatment system 150 based on the predicted load, for example, to allow optimal balancing between fuel efficiency and reductant efficiency.

In some embodiments, the engine management circuit 184 may also be configured to selectively use or cause engine braking for heating the aftertreatment system 150.

Engine braking occurs when the retarding forces within an engine are used to slow a vehicle down, as opposed to using additional external braking mechanisms such as friction brakes or magnetic brakes. Engine braking may correspond to an increased torque which may yield hotter exhaust gas that can be used to heat the SCR catalyst 162. In some embodiments, the engine management circuit 184 may be configured to use the predicted load to predict occurrence of engine braking so as to avoid hydrocarbon insertion in the aftertreatment system 150 and/or activation of the heating system 169.

The reductant management circuit 188 is configured to adjust an amount of reductant to be inserted into the aftertreatment system 150 based on a predicted load. In some embodiments, the reductant management circuit 188 may use a predicted cruise speed of the vehicle 10 to adjust an amount of reductant inserted into the aftertreatment system 150 and/or adjust aftertreatment system diagnostics. For example, the reductant management circuit 188 maybe configured to enable aftertreatment system diagnostics during steady state operations of the engine 101 to determine amount of NOx gases in the exhaust gas emitted by the engine 101, exhaust flow rate and/or other inputs, and disable such diagnostics during transient conditions when diagnostic may not be reliable.

For example, the reductant management circuit 188 may use predicted cruise speed, for example, active with speed modulation, active without speed modulation or inactive as determined by the cruise speed state determination circuit 177 to enable aftertreatment system diagnostics. For example, a predicted cruise speed state of active without modulation indicates that steady state conditions will persist for a predetermined duration. The reductant management circuit 188 may be configured to change the actual cruise speed based on the predicted cruise speed (e.g., from active without speed modulation to active with speed modulation) to facilitate the reductant insertion assembly diagnostics.

Expanding further, since reductant insertion assembly diagnostics may be calibrated to maintain high ammonia to NOx ratio for extended duration, this condition would not be met during active with speed modulation cruise speed state, where many exhaust gas temperature and NOx transients occur over a short period of time. The reductant management circuit 188 may be configured to use the predicted cruise speed state to pause or disable the reductant insertion assembly diagnostics during a cruise speed state of active with speed modulation to provide confidence that the diagnostics are not performed during transient operating conditions.

The reductant management circuit 188 may also be configured to use the predicted cruise speed state to relax ammonia slip limits of the aftertreatment system 150. For example, the ammonia slip limits may be set to stringent values to ensure that the ammonia slip is within thresholds during transient operation or at low vehicle speed. Predicted cruise speed state may indicate that steady state conditions or high vehicle speed will persist for a specified duration. In such situations, the reductant management circuit 188 maybe configured to relax ammonia slip limits when predicted cruise speed state is active without speed modulation leading to lower reductant consumption and/or lower amount of NOx.

In some embodiment, the reductant management circuit 188 may also be configured to adjust a cruise speed of the vehicle 10 based on an amount of ammonia stored in the aftertreatment system 150. For example, the SCR catalyst 162 included in the aftertreatment system 150 may build up stored ammonia when operating under cruise control (or coasting). In response to the load prediction circuit 174 predicting an anticipated high engine load or torque demand, the reductant management circuit 188 may increase reductant insertion so as to enable the SCR catalyst 162 to build up ammonia storage for use during the high engine load or torque demand event, for example, to ensure faster response times. Furthermore, the dynamic torque management circuit 183 and/or the engine management circuit 184 may cause greater amount of coasting events or prolong coasting events, for example, to adjust weightage between fuel efficiency and reductant efficiency based on the predicted load demand.

As previously described herein, the reductant management circuit 188 may be configured to manage the amount of reductant inserted into the aftertreatment system 150. Ammonia consumption by the SCR catalyst 162 occurs at a slower timescale relative to engine 101, transmission 102 and/or vehicle 10 dynamics. Availability of predicted load and/or aftertreatment temperature information may allow the reductant management circuit 188 to react faster to predicted changes in load, NOx concentration in the exhaust gas and/or aftertreatment system temperature so as to increase reductant consumption efficiency.

For example, in some embodiments, in response to the load prediction circuit 174 predicting an upcoming decrease in load on the engine 101 (e.g., the road grade having a downhill), the reductant management circuit 188 may start reducing an amount of reductant inserted into the aftertreatment system 150, based on the predicted decrease in engine load, thereby reducing reductant consumption. In some embodiments, the reductant management circuit 188 may also be configured to modulate the amount of reductant inserted into the aftertreatment system 150 based on predicted temperature of the aftertreatment system 150 and/or a predicted amount of NOx in the exhaust gas produced by the engine 101, i.e., the engine out NOx (EO NOx). For example, in response to the SCR temperature prediction circuit 175 predicting an increase in the aftertreatment system 150 temperature, and the aftertreatment state determination circuit 176 predicting an increase in EO NOx, the reductant management circuit 188 may be configured to start inserting reductant early into the aftertreatment system 150.

In some embodiments, the dynamic torque management circuit 183 may also be configured to adjust engine torque so as to adjust the amount of EO NOx, for example, to lower reductant consumption and increase reductant consumption efficiency. For example, in response to the aftertreatment state determination circuit 176 predicting transients in EO NOx (e.g., due to changing road grade, changing environmental conditions, etc. as predicted by the load prediction circuit 174), the dynamic torque management circuit 183 may dynamically limit torque so as to dynamically limit EO NOx and reduce reductant consumption. In other embodiments, the dynamic torque management circuit 183 may dynamically limit aftertreatment system temperature transients through dynamic torque limits in response to predicted SCR temperature or other exhaust gas temperature determined by the SCR temperature prediction circuit 175. This may result in lower ammonia slips and improve reductant efficiency. The dynamic torque management circuit 183 may be configured to adjust a rate or amount of torque limit based on weightage between fuel efficiency and reductant efficiency.

The route management circuit 186 may be configured to adjust a route of the vehicle 10 or a plurality of vehicles included in a fleet to adjust the aftertreatment system temperature and/or reduce reductant consumption. For example, the route management circuit 186 may be configured to adjust a route of the vehicle 10 or the plurality of vehicles included in the fleet based on need for thermal management for a specific vehicle (e.g., the vehicle 10) included in the fleet. For example, for a particular vehicle (e.g., the vehicle 10), the route management circuit 186 may select a particular route from available route options based on availability of high engine load in earlier part of the route so as to bring the SCR catalyst 162 to a desired temperature faster. In such embodiments, the controller 170 may include a central controller structured to control the operations of the plurality of vehicles included in the fleet. For example, the central controller may be configured to communicate route information to respective controllers included in each of the plurality of vehicles of the fleet based on external static or dynamic inputs received by the central controller and/or internal inputs received from each vehicle.

Figure 5:
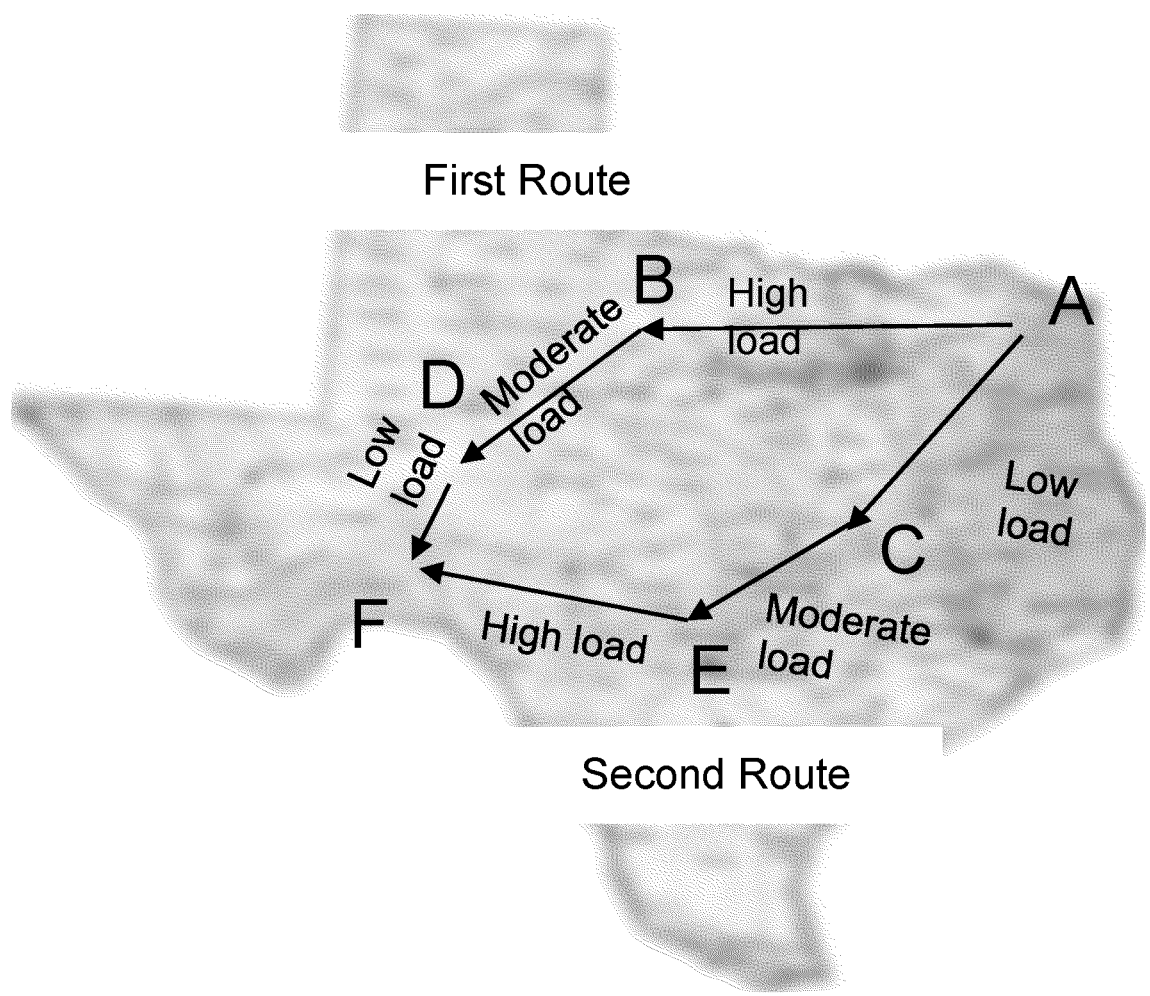
FIG. 5 is an illustration of an example vehicle route and loads experienced by the vehicle between various legs of the route.

Furthermore, the route selection may also be performed to provide a high engine load route so as to allow exhaust gas temperature and thereby, the SCR catalyst temperature to increase to a level sufficient for regenerating the SCR catalyst 162 (e.g., to enable oxidation of SCR catalyst poisons). For example, FIG. 5 shows example route options for the vehicle 10. To reach the position F from position A, two route options are available. The first route includes a first leg from position A to B which exerts a high load on the engine 101, a second leg from position B to D which exerts a moderate load on the engine 101, and a third leg from position D to F which exerts a low load on the engine 101. In contrast, the second route includes a first leg from position A to C which exerts a low load on the engine 101, a second leg from position C to E which exerts a moderate load on the engine 101, and a third leg from position E to F which exerts a high load on the engine 101. In response to the aftertreatment state determination circuit 176 determining that the SCR catalyst 162 is to be regenerated, the route management circuit 186 may be configured to instruct the vehicle 10 (e.g., instruct an operator of the vehicle 10) to travel through the first route so as to exert a high load on the engine 101 at the beginning of the route. This results in an increase in a temperature of the exhaust gas, thereby causing an increase in the SCR catalyst 162 temperature and regeneration thereof at the beginning of the route.

In some embodiments, the route management circuit 186 and/or the reductant management circuit 188 may be configured to use route information (e.g., road grade, traffic conditions, environmental conditions, etc.) predicting engine load, predicted SCR catalyst temperature, and/or any other suitable vehicle parameter to estimate a total amount of reductant to be consumed by the vehicle 10 on the route. The route management circuit 186 may be configured to use this information to provide reductant refueling locations and/or quantity. Furthermore, the route management circuit 186 may utilize information of reductant costs at various location along the route and provide the lowest cost option to vehicle 10 and/or operator of the vehicle 10 for reductant refill.

The route management circuit 186 may also be configured to assign a route to the vehicle 10 or a plurality of vehicles included in a fleet based on predicted reductant consumption, EO NOx and/or any other parameters. In some embodiments, the route management circuit 186 may reorder vehicles base on a route profile and prior diagnostic information. For example, the route management circuit 186 may be configured to assign a vehicle including a new SCR catalyst to a route with high predicted EO NOx or a route with high predicted EO NOx transients. In some embodiments, the route management circuit 186 may use a diagnostic signature of the aftertreatment system 150, a SCR catalyst 162 condition, a fuel consumption of the engine 101 or any other parameter of the vehicle 10 to meet emission targets of a particular route trading off with fuel economy. In some embodiments, the route management circuit 186 may be configured to use predicted information related to ambient weather conditions, for example ambient humidity, wind speed, etc. in addition to engine condition, fuel composition and/or estimated EO NOx over the route, and then assign routes to each of the vehicle in the fleet based on predicted fuel efficiency and reductant consumption efficiency. This may help reduce NOx emissions, reduce service downtime or delay service while maintaining other performance parameters.

In this manner, the route management circuit 186 may be configured to use information of reductant fueling stations, state of the aftertreatment system 150, diagnostic signature, or any other suitable parameter to assign a route for the vehicle 10 so to reduce reductant consumption and avoid derate (i.e., operation of the engine 101 and/or the aftertreatment system 150 at less than maximum capacity). In some embodiments, the route management circuit 186 cooperatively with the engine management circuit 184 and/or the charge management circuit 185 may manage engine fueling such that the engine 101 emits low EO NOx until the vehicle 10 reaches a refueling station.

Figure 6:
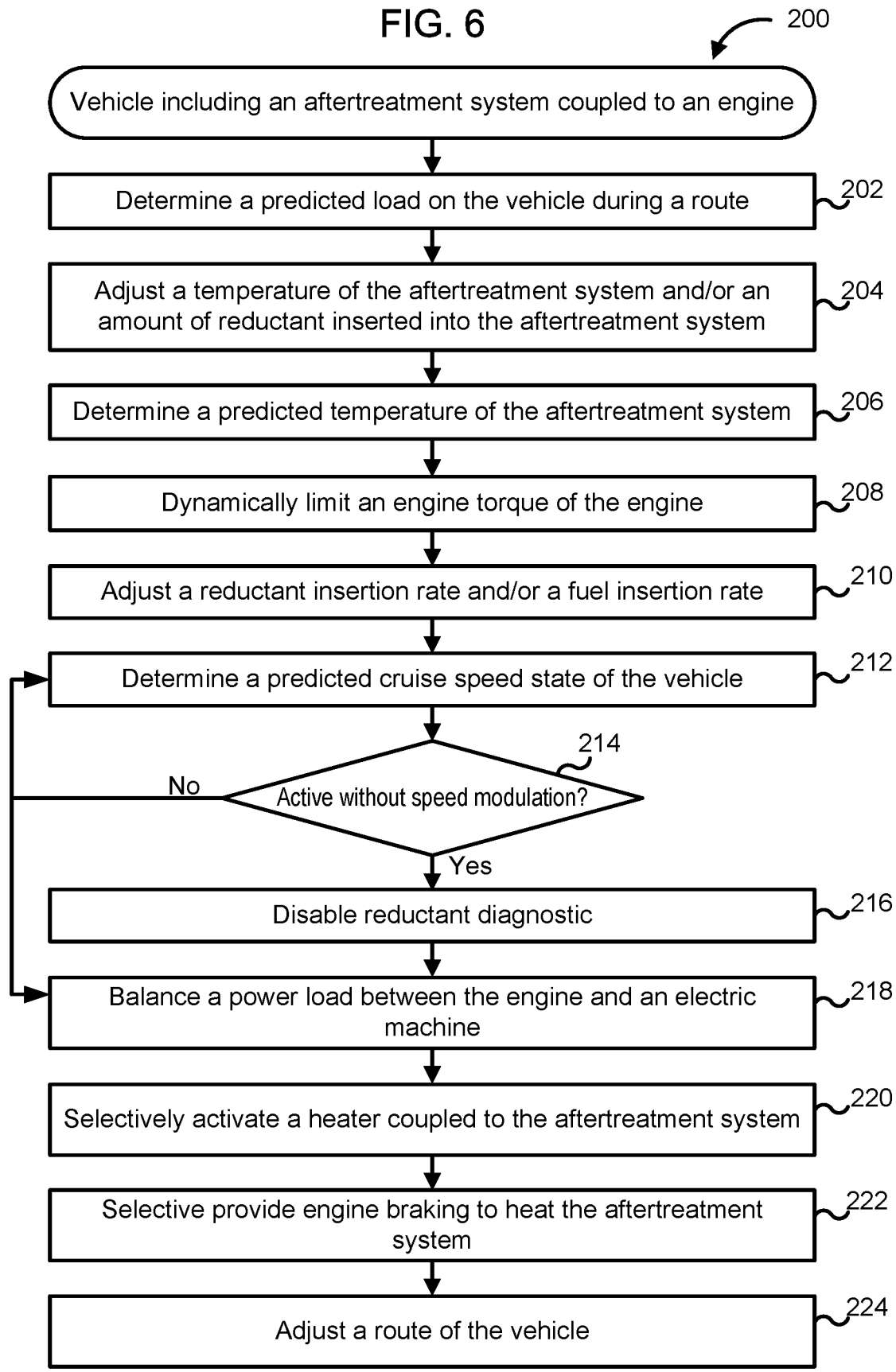
FIG. 6 is schematic flow diagram of method for predictively managing a temperature of an aftertreatment system or an amount of reductant inserted into the aftertreatment system based on various vehicle parameters.

FIG. 6 is a schematic flow diagram of an example method 200 for managing a temperature of an aftertreatment system (e.g., the aftertreatment system 150) included in a vehicle (e.g., the vehicle 10) and/or an amount of reductant inserted into the aftertreatment system. The method 200 includes determining a predicted load on the vehicle during a route, at 202. For example, the load prediction circuit 174 may predict the load to be encountered by the vehicle 10, as previously described herein. At 204, a temperature of the aftertreatment system and/or an amount of reductant inserted into the aftertreatment system is adjusted based on the predicted load. For example, the temperature management circuit 182 may adjust a temperature of the aftertreatment system 150 and/or the reductant management circuit 188 may adjust an amount of reductant inserted into the aftertreatment system 150 based on the predicted load.

In some embodiments, the method 200 also includes determining a predicted temperature of the aftertreatment system, at 206. For example, the SCR temperature prediction circuit 175 may predict a temperature of the SCR catalyst 162 based on the predicted load, as previously described herein. At 208, a dynamic torque is limited based on the predicted temperature of the aftertreatment system. For example, the dynamic torque management circuit 183 may limit a torque, for example, by adjusting the transmission 102 (e.g., to prevent fast temperature transients or oscillations in temperature of the aftertreatment system 150 or prevent overheating of the SCR catalyst 162, as previously described herein). In some embodiments, dynamically limiting the torque may also limit ammonia slip and amount of NOx gases emitted from the aftertreatment system 150.

At 210, a reductant insertion rate into the aftertreatment system and/or a fuel insertion rate into the engine are adjusted based on at least one of the predicted load and the predicted temperature of the aftertreatment system. For example, the reductant management circuit 188 may adjust an amount of reductant inserted into the aftertreatment system 150 and/or the engine management circuit 184 may adjust an amount of fuel inserted into the engine 101 based on the predicted load and/or the predicted temperature of the aftertreatment system 150.

In some embodiments, the method 200 includes determining a predicted cruise speed of the vehicle, at 212. For example, the cruise speed state determination circuit 177 may be configured to determine whether the predicted cruise speed is active or inactive, is active with modulation or is active without modulation. At 214, it is determined if the cruise speed is active with speed modulation. If the cruise speed is inactive or active without modulation, the method 200 returns to operation 212 or proceeds to operation 218. In response to determining that the cruise speed is active with speed modulation at 214, the method proceeds to operation 216 and a reductant diagnostic is paused or disabled, for example, to reduce reductant consumption as previously described herein until operating conditions are more favorable for making a diagnostic decision. In some embodiments, the method 200 may also include adjusting a cruise speed of the vehicle (e.g., selectively adjust between active with modulation and active without modulation) based on an amount of ammonia stored in the aftertreatment system.

In some embodiments in which the vehicle (e.g., the vehicle 10) also includes an electromagnetic device (e.g., the electromagnetic device 106), the method 200 also includes balancing a power load between the engine and the electromagnetic device of the vehicle so as to exert a predetermined load on the engine for maintaining a temperature of the aftertreatment system, at 218. For example, the engine management circuit 184 and the charge management circuit 185 may be configured to balance the power load between the engine 101 and the electromagnetic device 106 for maintaining or otherwise adjusting a temperature of the SCR catalyst 162 of the aftertreatment system 150 or adjusting an amount of NOx inserted into the aftertreatment system 150, as previously described herein.

In some embodiments in which the vehicle (e.g., the vehicle 10) also includes a heating system (e.g., the heating system 169) coupled to the aftertreatment system (e.g., the aftertreatment system 150), the method 200 may also include selectively activating the heating system for maintaining a temperature of the aftertreatment system based on a current state of the aftertreatment system and a current load on the engine, and the predicted load, at 220. For example, the temperature management circuit 182 may be configured to selectively activate the heating system 169 based on a current and/or predicted state of the aftertreatment system 150 determined by the aftertreatment state determination circuit 176, a current load on the engine 101 and/or a predicted load on the vehicle 10 as determined by the load prediction circuit 174.

In some embodiments, the method 200 may also include selectively causing engine braking so as to heat the aftertreatment system, at 222. For example, the engine management circuit 184 may be configured to selectively cause engine braking so as to heat the SCR catalyst 162 included in the aftertreatment system 150 based on a predicted aftertreatment system temperature.

In some embodiments, the method 200 also includes adjusting a route of the vehicle based on an expected load on the engine or an expected reductant consumption efficiency of the aftertreatment system. For example, the route management circuit 186 may be configured to select a vehicle route for the vehicle 10 based on the predicted load on the vehicle 10 or predicted reductant consumption by the vehicle 10 on the route, as previously described herein.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A vehicle, comprising:
an aftertreatment system configured to reduce constituents of an exhaust gas; and
a controller configured to:
receive information regarding an upcoming route of the vehicle;
determine a predicted load on the vehicle during the route based on the received information;
adjust at least one of (i) a temperature of the aftertreatment system via controlling an engine coupled to the aftertreatment system, a hydrocarbon insertion assembly, or a heater coupled to the aftertreatment system, or (ii) an amount of a reductant inserted into the aftertreatment system via controlling a reductant insertion assembly based on the predicted load; and selectively cause engine braking so to heat the aftertreatment system.

2. The vehicle of claim 1, wherein the controller is further configured to:
determine a predicted temperature of the aftertreatment system based on the predicted load; and
dynamically limit an engine torque of the engine of the vehicle to limit engine transients and prevent fast temperature transients or oscillations in a temperature of the aftertreatment system based on the predicted temperature.

3. The vehicle of claim 2, wherein dynamically limiting the engine torque also limits ammonia slip and an amount of NOx gases included in an exhaust gas emitted from the aftertreatment system.

4. The vehicle of claim 2, wherein the controller is further configured to:
adjust at least a reductant insertion rate of the reductant into the aftertreatment system or a fuel insertion rate of a fuel into the engine and/or aftertreatment system based on at least one of the predicted load and the predicted temperature.

5. The vehicle of claim 1, wherein the controller is further configured to:
determine a predicted cruise speed of the vehicle;
in response to determining that the predicted cruise speed of the vehicle is active with speed modulation, pause or disable a reductant diagnostic.

6. The vehicle of claim 5, wherein the controller is further configured to adjust a cruise speed of the vehicle based on an amount of ammonia stored in the aftertreatment system.

7. The vehicle of claim 1, further comprising an electromagnetic device, wherein the controller is further configured to balance a power load between the engine of the vehicle and the electromagnetic device so as to exert a predetermined load on the engine for maintaining a temperature of the aftertreatment system.

8. The vehicle of claim 7, further comprising a heating system operably coupled to the aftertreatment system, wherein the controller is further configured to selectively activate the heating system for maintaining the temperature of the aftertreatment system based on a current state of the aftertreatment system, a current load on the engine, and the predicted load.

9. A system comprising:
a controller coupled to an engine and an aftertreatment system of the system, the controller configured to:
receive information regarding an upcoming route of a vehicle;
determine a predicted load on a vehicle during the route based on the received information;
adjust at least one of (i) a temperature of the aftertreatment system via controlling an engine coupled to the aftertreatment system, a hydrocarbon insertion assembly, or a heater coupled to the aftertreatment system, or (ii) an amount of a reductant inserted into the aftertreatment system via controlling a reductant insertion assembly based on the predicted load;
determine a predicted cruise operation of the vehicle based on the predicted load; and
in response to determining that the predicted cruise operation of the vehicle is active with speed modulation, pause or disable a reductant diagnostic.

10. The system of claim 9, wherein the controller is further configured to:
determine a predicted temperature of the aftertreatment system based on the predicted load; and
dynamically limit an engine torque of the engine of the vehicle to limit engine transients and prevent fast temperature transients or oscillations in a temperature of the aftertreatment system based on the predicted temperature.

11. The system of claim 10, wherein the controller is further configured to:
adjust at least a reductant insertion rate of the reductant into the aftertreatment system or a fuel insertion rate of a fuel into the aftertreatment system based on at least one of the predicted load and the predicted temperature.

12. The system of claim 9, wherein the controller is further configured to adjust a cruise speed of the vehicle based on an amount of ammonia stored in the aftertreatment system.

13. The system of claim 9, further comprising an electromagnetic device, wherein the controller is further configured to balance a power load between the engine of the vehicle and the electromagnetic device so as to exert a predetermined load on the engine for maintaining a temperature of the aftertreatment system.

14. The system of claim 13, further comprising a heating system operably coupled to the aftertreatment system, wherein the controller is further configured to selectively activate the heating system for maintaining the temperature of the aftertreatment system based on a current state of the aftertreatment system and a current load on the engine, and the predicted load.

15. The system of claim 9, wherein the controller is further configured to selectively cause engine braking so as to heat the aftertreatment system.

16. A method, comprising:
determining a predicted load on a vehicle during a route, the vehicle including an aftertreatment system coupled to an engine;
adjusting at least one of a temperature of the aftertreatment system or an amount of a reductant inserted into the aftertreatment system based on the predicted load; and
selectively causing engine braking via controlling the engine so to heat the aftertreatment system.

17. The method of claim 16, further comprising:
determining a predicted temperature of the aftertreatment system based on the predicted load; and
dynamically limiting an engine torque of the engine of the vehicle to limit engine transients and prevent fast temperature transients or oscillations in a temperature of the aftertreatment system based on the predicted temperature.

18. The method of claim 16, further comprising:
adjusting at least a reductant insertion rate of the reductant into the aftertreatment system or a fuel insertion rate of a fuel into the engine and/or aftertreatment system based on at least one of the predicted load and the predicted temperature.

19. A system comprising:
an electromagnetic device; and
a controller coupled to the electromagnetic device, an engine, and an aftertreatment system, the controller configured to:
determine a predicted load on at least a part of the system;
adjust at least one of a temperature of the aftertreatment system or an amount of a reductant inserted into the aftertreatment system based on the predicted load; and balance a power load between the engine of the system and the electromagnetic device so as to exert a predetermined load on the engine for substantially maintaining a temperature of the aftertreatment system.

20. The system of claim 19, further comprising a heating system coupled to the aftertreatment system, wherein the controller is configured to selectively activate the heating system for maintaining the temperature of the aftertreatment system based on a current state of the aftertreatment system, a current load on the engine, and the predicted load.

* * * * *